United States Patent
Kuboshima

(10) Patent No.: US 12,401,384 B2
(45) Date of Patent: Aug. 26, 2025

(54) RECEPTION DEVICE FOR RECEIVING SIGNALS

(71) Applicant: JVCKENWOOD Corporation, Yokohama (JP)

(72) Inventor: Ryo Kuboshima, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 355 days.

(21) Appl. No.: 17/817,663

(22) Filed: Aug. 5, 2022

(65) Prior Publication Data
US 2023/0038667 A1 Feb. 9, 2023

(30) Foreign Application Priority Data
Aug. 6, 2021 (JP) .................................. 2021-130293

(51) Int. Cl.
*H04B 1/26* (2006.01)
(52) U.S. Cl.
CPC ....................................... *H04B 1/26* (2013.01)
(58) Field of Classification Search
CPC .............. H03F 1/3211; H03F 3/45475; H03F 2200/129; H03F 2200/294; H03F 2200/451; H03F 2203/45528; H04B 1/16; H04B 1/26; H03M 3/3287; H03M 3/43; H03M 3/454; H04L 25/02; H04L 27/10; H04L 27/32; H04L 27/36
See application file for complete search history.

(56) References Cited

U.S. PATENT DOCUMENTS

| | | | | |
|---|---|---|---|---|
| 5,108,334 | A * | 4/1992 | Eschenbach | H04B 1/26 331/22 |
| 6,125,135 | A * | 9/2000 | Woo | G01S 19/32 375/150 |
| 6,404,293 | B1 * | 6/2002 | Darabi | H03B 21/01 331/37 |
| 2001/0007151 | A1 * | 7/2001 | Vorenkamp | H10D 89/60 348/731 |
| 2002/0057752 | A1 * | 5/2002 | Denno | H03D 3/009 375/346 |
| 2002/0142748 | A1 * | 10/2002 | Earls | H03D 7/161 455/314 |

(Continued)

FOREIGN PATENT DOCUMENTS

JP    2011014961 A    1/2011

*Primary Examiner* — Jinsong Hu
*Assistant Examiner* — Rui M Hu
(74) *Attorney, Agent, or Firm* — Shih IP Law Group, PLLC

(57) ABSTRACT

A first mixer and a second mixer subject a received signal to quadrature detection by using a local signal. The first mixer and the second mixer subject the received signal subjected to the quadrature detection to frequency conversion so that, of harmonics of a frequency generated by a reference oscillator oscillation, a harmonic having a frequency closest to a frequency of the received signal subjected to the quadrature detection has a predetermined frequency. A first HPF and a second HPF attenuate the predetermined frequency in the received signal subjected to frequency conversion. The first mixer and the second mixer perform frequency conversion so that the frequency of the received signal is 0 Hz. An adjacent channel attenuation filter attenuates an adjacent channel component in the received signal subjected to frequency conversion.

2 Claims, 6 Drawing Sheets

(56) References Cited

U.S. PATENT DOCUMENTS

| | | | | |
|---|---|---|---|---|
| 2004/0057534 A1* | 3/2004 | Masenten | ............ | H03M 3/3287 |
| | | | | 375/316 |
| 2004/0087296 A1* | 5/2004 | Park | ....................... | H04B 1/109 |
| | | | | 455/283 |
| 2004/0213358 A1* | 10/2004 | Patel | ..................... | H04N 5/4446 |
| | | | | 375/E7.002 |
| 2005/0195336 A1* | 9/2005 | Waight | ................... | H03D 3/007 |
| | | | | 348/E5.113 |
| 2009/0258629 A1* | 10/2009 | Ritchey | ................... | H03D 7/161 |
| | | | | 455/313 |
| 2010/0110307 A1* | 5/2010 | Leme | ..................... | H04N 5/455 |
| | | | | 348/731 |
| 2010/0285761 A1* | 11/2010 | Morris | ..................... | H04B 1/26 |
| | | | | 455/113 |
| 2011/0065406 A1* | 3/2011 | Feng | .................... | H04B 1/1036 |
| | | | | 455/313 |
| 2013/0231055 A1* | 9/2013 | Leroux | ................... | H04W 4/10 |
| | | | | 455/41.2 |
| 2015/0256374 A1* | 9/2015 | Ohba | ..................... | H04B 1/1027 |
| | | | | 375/344 |
| 2017/0279950 A1* | 9/2017 | Auranen | .............. | H04M 1/72412 |
| 2018/0175905 A1* | 6/2018 | Nabki | ..................... | H04L 25/00 |
| 2018/0348341 A1* | 12/2018 | Phelan | ................... | G01S 7/023 |
| 2019/0200125 A1* | 6/2019 | Hilding | .................. | H04R 5/033 |
| 2022/0345090 A1* | 10/2022 | Banerjee | ............. | H03F 3/45475 |
| 2023/0100595 A1* | 3/2023 | Hur | ........................ | H04B 1/006 |
| | | | | 455/552.1 |
| 2024/0007137 A1* | 1/2024 | Nicholls | ................ | H03D 7/161 |

\* cited by examiner

RECEPTION DEVICE FOR RECEIVING SIGNALS

CROSS-REFERENCE TO RELATED APPLICATION

This application is based upon and claims the benefit of priority from the prior Japanese Patent Application No. 2021-130293, filed on Aug. 6, 2021, the entire contents of which is incorporated herein by reference.

BACKGROUND OF THE INVENTION

1. Field

The present invention relates to a reception technology and, more particularly, to a reception device that receives signals.

2. DESCRIPTION OF THE RELATED ART

Generally, a wireless communication device includes a reception circuit that receives signal waves transmitted from outside and converts a received radio frequency (RF) signal into an intermediate frequency (IF) signal by frequency conversion for demodulation and an oscillation circuit that outputs a local signal for performing frequency conversion. The oscillation circuit includes a reference oscillator and performs phase locked loop (PLL) control by using the frequency generated by the reference oscillator by oscillation as a reference frequency. The reference oscillator outputs a reference signal at the reference frequency. When the reference oscillator generates a signal at the reference frequency, it normally generates harmonics thereof as well. Radiation of harmonics to the reception circuit and interference of harmonics with the RF signal may cause suppression of the reception sensitivity. Patent literature 1 describes reducing suppression of the reception sensitivity caused by interference of harmonics, by changing the reference frequency.

[Patent literature 1] JP2011-14961

In wireless communication devices as described in patent literature 1, however, it is necessary to set whether to change the reference frequency in accordance with the received frequency.

SUMMARY OF THE INVENTION

A reception device according to an embodiment includes: a reference oscillator; an oscillation circuit that performs PLL control by using a frequency generated by the reference oscillator by oscillation as a reference frequency; a quadrature detector that subjects a receiving signal by using a local signal output from the PLL control in the oscillation circuit; a first complex mixer that subjects an in-phase component and an orthogonal component of the received signal subjected to the quadrature detection by the quadrature detector to frequency conversion so that, of harmonics of the frequency generated by the reference oscillator by oscillation, a harmonic having a frequency closest to a frequency of the received signal subjected to the quadrature detection by the quadrature detector has a predetermined frequency; a first attenuation filter that attenuates the predetermined frequency in the in-phase component of the received signal subjected to the frequency conversion by the first complex mixer; a second attenuation filter that attenuates the predetermined frequency in the orthogonal-phase component of the received signal subjected to the frequency conversion by the first complex mixer; a second complex mixer that subjects the in-phase component of the received signal passed through the first attenuation filter and the orthogonal component of the received signal passed through the second attenuation filter to frequency conversion so that the frequency of the received signal is 0 Hz; a first adjacent channel attenuation filter that attenuates an adjacent channel component in the in-phase component of the received signal subjected to the frequency conversion by the second complex mixer; and a second adjacent channel attenuation filter that attenuates an adjacent channel component in the orthogonal phase component of the received signal subjected to the frequency conversion by the second complex mixer.

Optional combinations of the aforementioned constituting elements, and implementations of the embodiment in the form of methods, apparatuses, systems, recording mediums, and computer programs, etc. may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

The invention will now be described by reference to the preferred embodiments. This does not intend to limit the scope of the present invention, but to exemplify the invention.

Embodiment 1

The knowledge that provides a basis for the embodiment will be described before describing the embodiment in specific details. The embodiment relates to a reception device that receives radio signals. The reception device generates a local signal by PLL control based on the reference frequency in the reference oscillator and subjects a received signal to quadrature detection by using the local signal. In that process, harmonics generated from the reference oscillator are superimposed on the received signal. As harmonics are superimposed on the received signal, interference between the received signal and the spurious component occurs after the detection. The spurious component having a frequency remote from the received signal is attenuated by an adjacent channel attenuation filter so that the impact of that spurious component on the reception characteristics is small. Meanwhile, the spurious component having a frequency close to the received signal, which may be included in the pass band of the adjacent channel attenuation filter, is not attenuated by the adjacent channel attenuation filter. Therefore, that spurious degrades the reception characteristics. It is therefore desired to suppress degradation of the reception characteristics even in the presence of the spurious component having a frequency close to the received signal, which may be included in the pass band of the adjacent channel attenuation filter. It is also desired to automatically reduce suppression of the reception sensitivity due to interference from spurious components.

Figure 1:
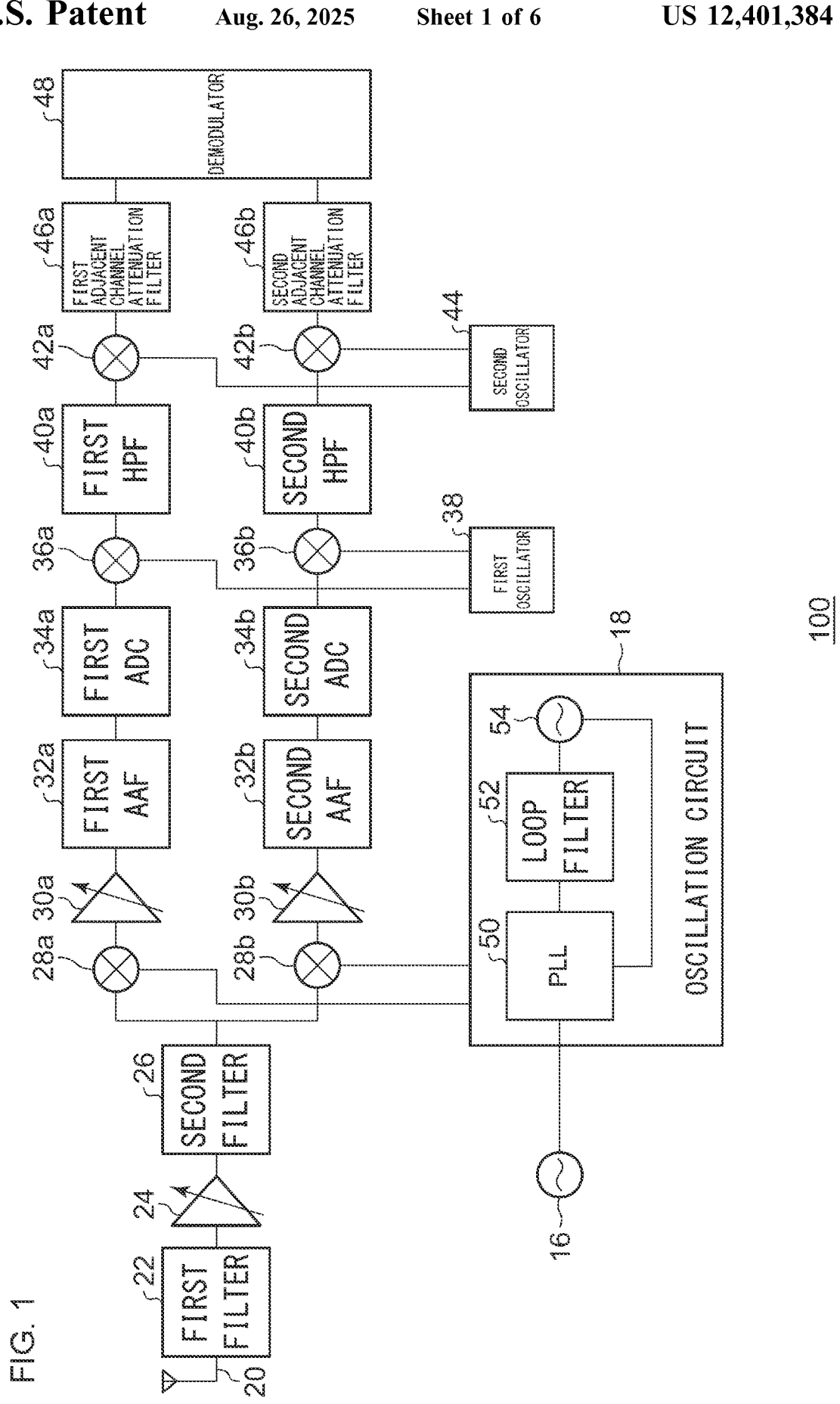
FIG. 1 shows a configuration of a reception device according to embodiment 1.

FIG. 1 shows a configuration of a reception device 100. The reception device 100 has a configuration of a LowIF receiver. The reception device 100 includes a reference oscillator 16, an oscillation circuit 18, an antenna 20, a first filter 22, a low noise amplifier (LNA) 24, a second filter 26, a first mixer 28a and a second mixer 28b, which are generically referred to as mixers 28, a first variable amplifier 30a and a second variable amplifier 30b, which are generically referred to as variable amplifiers 30, a first AAF 32a and a second AAF 32b, which are generically referred to as anti-aliasing filters (AAF) 32, a first ADC 34a and a second ADC 34b, which are generically referred to as analog to digital converters 34, a first mixer 36a and a second mixer 36b, which are generically referred to as mixers 36, a first oscillator 38, a first HPF 40a and a second HPF 40b, which are generically referred to as high pass filters 40, a first mixer 42a and a second mixer 42b, which are generically referred to as mixers 42, a second oscillator 44, a first adjacent channel attenuation filter 46a and a second adjacent channel attenuation filter 46b, which are generically referred to as adjacent channel attenuation filters 46, and a demodulator 48. The oscillation circuit 18 includes a PLL 50, a loop filter 52, a voltage-controlled oscillator (VCO) 54.

The antenna 20 receives a radio frequency (RF) signal from a transmitting device (not shown). The RF signal represents a received signal. The RF signal is, for example, FM-modulated, but the embodiment is non-limiting as to the nature of the RF signal. The antenna 20 outputs the received RF signal to the first filter 22. The first filter 22 reduces the noise component included in the RF signal. The first filter 22 outputs the RF signal having the reduced noise component (hereinafter, this will also be referred to as "RF signal") to the LNA 24.

Figure 2:
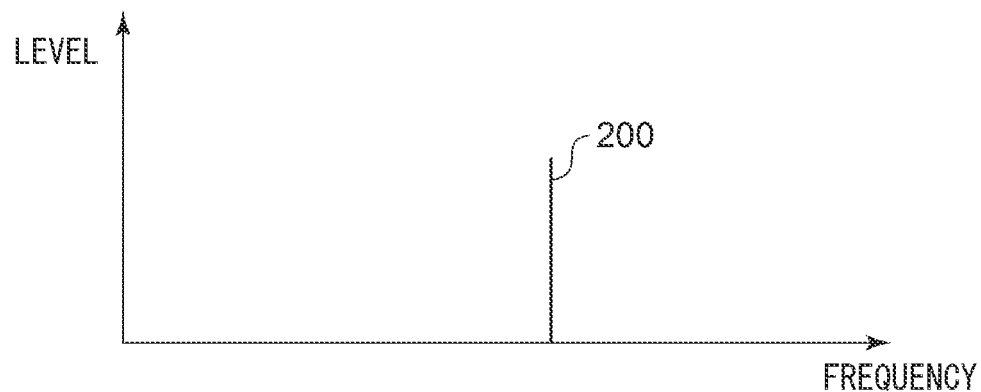
FIG. 2 shows the spectrum of a received signal.

The LNA 24 amplifies the RF signal from the first filter 22. The LNA 24 outputs the amplified RF signal to the second filter 26. The second filter 26 reduces the noise component included in the amplified RF signal. The second filter 26 outputs the RF signal that has the reduced noise component and has been amplified (hereinafter, this will also be referred to as "RF signal") to the first mixer 28a and the second mixer 28b. FIG. 2 shows the spectrum of a received signal 200. This represents the RF signal output from the second filter 26 of FIG. 1. As shown in the figure, the received signal 200 is, for example, an unmodulated signal. Reference is made back to FIG. 1.

Figure 3:
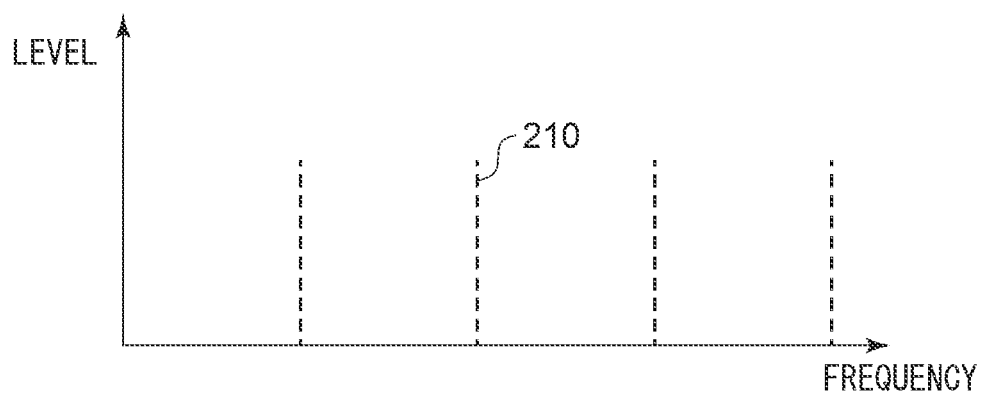
FIG. 3 shows the spectrum of a spurious component produced by the reference oscillator.

The reference oscillator 16 outputs a frequency that servers as a reference (hereinafter, referred to as "reference frequency") to the oscillation circuit 18. The oscillation circuit 18 performs PLL control based on the reference frequency generated by the reference oscillator 16 by oscillation. PLL control is performed by the PLL 50, the loop filter 52, and the VCO 54 so that the local signal is output to the first mixer 28a and the second mixer 28b. The phase of the local signal output to the second mixer 28b is shifted by 90 degrees from the phase of the local signal output to the first mixer 28a. FIG. 3 shows the spectrum of a spurious component 210 produced by the reference oscillator 16. This represents harmonics generated from the reference oscillator 16 by oscillation. In this case, it is assumed that the frequencies of a plurality of spurious components 210 from the reference oscillator 16 are not equal to the frequency of the received signal 200 of FIG. 2.

Figure 4:
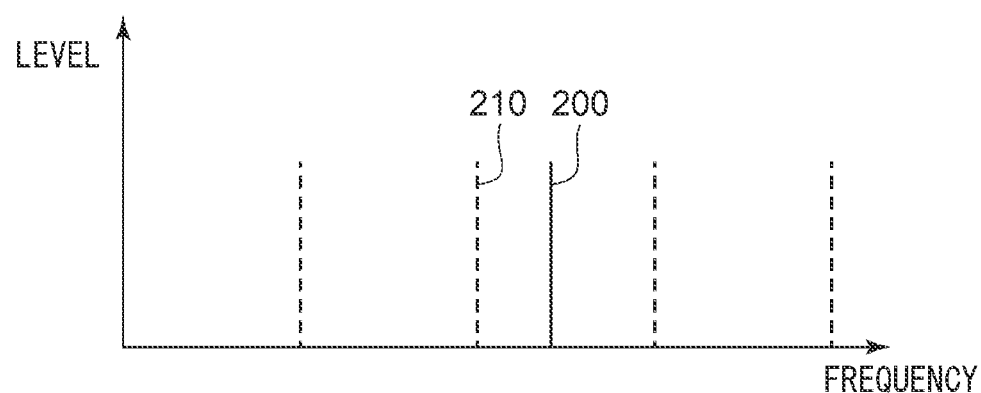
FIG. 4 shows the spectrum of the received signal and the spurious component produced by the reference oscillator.

FIG. 4 shows the spectrum of the received signal 200 and the spurious component 210 produced by the reference oscillator 16. The figure shows a signal in which the spurious component 210 produced by the reference oscillator 16 is superimposed on the received signal 200 and is a signal that is input to the first mixer 28a and the second mixer 28b of FIG. 1. Reference is made back to FIG. 1.

The first mixer 28a generates an in-phase component (hereinafter, "I signal") of a LowIF (hereinafter, referred to as "first LowIF") signal by multiplying the RF signal from the second filter 26 with the local signal from the oscillation circuit 18. The first LowIF is a frequency lower than RF and higher than 0 Hz. The frequency of the local signal from the oscillation circuit 18 is set so that the frequency of the I signal generated by the first mixer 28a is the first LowIF. The first mixer 28a outputs the I signal to the first variable amplifier 30a.

The second mixer 28b generates the orthogonal component (hereinafter, "Q signal") of the first LowIF signal by multiplying the RF signal from the second filter 26 with the local signal from the oscillation circuit 18. The Q signal is a signal orthogonal to the I signal. The second mixer 28b outputs the Q signal to the second variable amplifier 30b. The first mixer 28a and the second mixer 28b correspond to a quadrature detector, and the quadrature detector subjects the RF signal to quadrature detection by using the local signal.

The first variable amplifier 30a adjusts the level of the I signal. The first variable amplifier 30a outputs the I signal with the adjusted level (hereinafter, also referred to as "I signal") to the first AAF 32a. The second variable amplifier 30b adjusts the level of the Q signal. The second variable amplifier 30b outputs the Q signal with the adjusted level (hereinafter, also referred to as "Q signal") to the second AAF 32b.

The first AAF 32a performs band limitation of the I signal. The first AAF 32a outputs the band-limited I signal (hereinafter, also referred to as "I signal") to the first ADC 34a. The second AAF 32b performs band limitation of the Q signal. The second AAF 32b outputs the band-limited Q signal (hereinafter, also referred to as "Q signal") to the second ADC 34b.

The first ADC 34a subjects the I signal from the first AAF 32a to analog-digital conversion. The first ADC 34a outputs the I signal converted into a digital signal (hereinafter, also referred to as "I signal") to the first mixer 36a. The second ADC 34b subjects the Q signal from the second AAF 32b to analog-digital conversion. The second ADC 34b outputs the Q signal converted into a digital signal (hereinafter, also referred to as "Q signal") to the second mixer 36b. The first ADC 34a and the second ADC 34b can be said to be a sampling unit that samples the signal subjected to quadrature detection according to a predetermined timing schedule.

The first oscillator 38 outputs an oscillation signal (hereinafter, "first oscillation signal") to the first mixer 36a and the second mixer 36b. The first mixer 36a generates a LowIF (hereinafter, referred to as "second LowIF") I signal (hereinafter, also referred to as "I signal") by multiplying the I signal from the first ADC 34a with the first oscillation signal from the first oscillator 38. The second LowIF is a frequency lower than the first LowIF and higher than 0 Hz. The frequency of the first oscillation signal is set so that the frequency of the I signal generated in the first mixer 36a is the second LowIF. The first mixer 36a outputs the I signal to the first HPF 40a. The second mixer 36b generates a second LowIF Q signal (hereinafter, also referred to as "Q signal") by multiplying the Q signal from the second ADC 34b with the first oscillation signal from the first oscillator 38. The second mixer 36b outputs the Q signal to the second HPF 40b.

Figure 5:
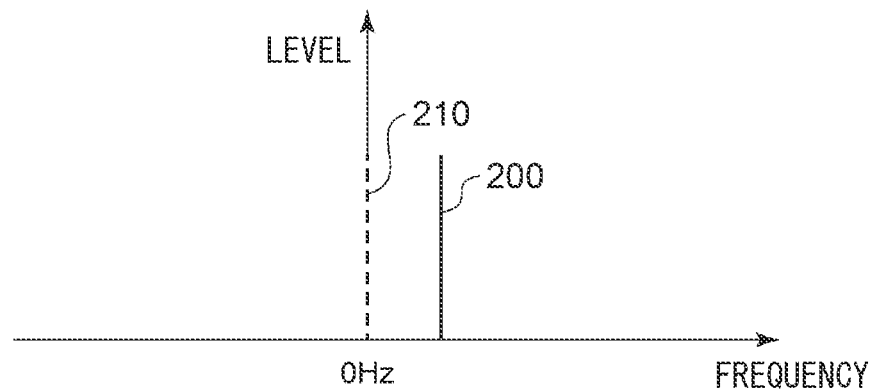
FIG. 5 shows the spectrum of the received signal and the spurious component produced by the reference oscillator that are subjected to frequency conversion.

FIG. 5 shows the spectrum of the received signal 200 and the spurious component 210 produced by the reference oscillator 16 that are subjected to frequency conversion. Of the plurality of spurious components 210 shown in FIG. 4, FIG. 5 shows only the spurious component 210 closest to the received signal 200. Further, the received signal 200 corresponds to the I signal and the Q signal described above and has the second LowIF. The second LowIF of the received signal 200 is set by the frequency conversion by the mixers 36 so that the spurious component 210 closest to the received signal 200 is at 0 Hz. Reference is made back to FIG. 1. The first mixer 36a and the second mixer 36b may be referred to as first complex mixers. The first complex mixers subject the in-phase component and the orthogonal component of the received signal 200 to frequency conversion so that, of the harmonics of the frequency generated by the reference oscillator 16 by oscillation, the harmonic of the frequency closest to the frequency of the received signal 200 is at 0 Hz.

Figure 6:
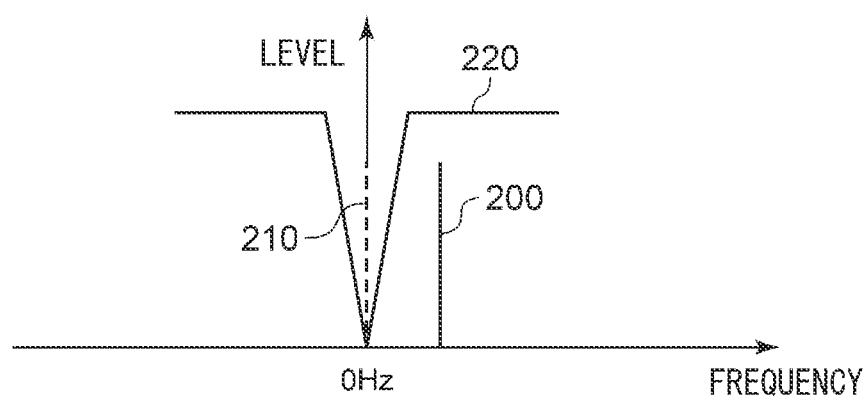
FIG. 6 shows a relationship between the received signal and the spurious component produced by the reference oscillator, which are subjected to frequency conversion, and the HPF.

The first HPF 40a is a filter that passes the high-frequency component of the I signal from the first mixer 36a. The first HPF 40a outputs the high-frequency component of the I signal (hereinafter, also referred to as "I signal") to the first mixer 42a. The first HPF 40a is also referred to as a first attenuation filter, and the first attenuation filter attenuates low frequencies in the in-phase component of the received signal 200 subjected to frequency conversion by the first complex mixers. The second HPF 40b is a filter that passes the high-frequency component of the Q signal from the second mixer 36b. The second HPF 40b outputs the high-frequency component of the Q signal (hereinafter, also referred to as "Q signal") to the second mixer 42b. The second HPF 40b is also referred to as a second attenuation filter, and the second attenuation filter attenuates the frequencies in the orthogonal component of the received signal 200 subjected to frequency conversion by the first complex mixers. FIG. 6 shows a relationship between the received signal 200 and the spurious component 210 produced by the reference oscillator 16, which are subjected to frequency conversion, and the HPF 40. In addition to what is shown in FIG. 5, FIG. 6 shows frequency characteristics 220 of the HPF 40. The HPF 40 passes the received signal 200 but reduces the spurious component 210. Reference is made back to FIG. 1.

The second oscillator 44 outputs the oscillation signal (hereinafter, "second oscillation signal") to the first mixer 42a and the second mixer 42b. The first mixer 42a generates a baseband I signal (hereinafter, also referred to as "I signal") by multiplying the I signal from the first HPF 40a with the second oscillation signal from the second oscillator 44. The frequency of the second oscillation signal is set so that the frequency of the I signal generated in the first mixer 42a is the baseband. The first mixer 42a outputs the I signal to the first adjacent channel attenuation filter 46a. The second mixer 42b generates a baseband Q signal (hereinafter, also referred to as "Q signal") by multiplying the Q signal from the second HPF 40b with the second oscillation signal from the second oscillator 44. The second mixer 42b outputs the Q signal to the second adjacent channel attenuation filter 46b. The first mixer 42a and the second mixer 42b are referred to as second complex mixers. The second complex mixers subject the in-phase component of the received signal 200 passed through the first attenuation filter and the orthogonal component of the received signal 200 passed through the second attenuation filter to frequency conversion so that the frequency of the received signal 200 is 0 Hz.

Figure 7:
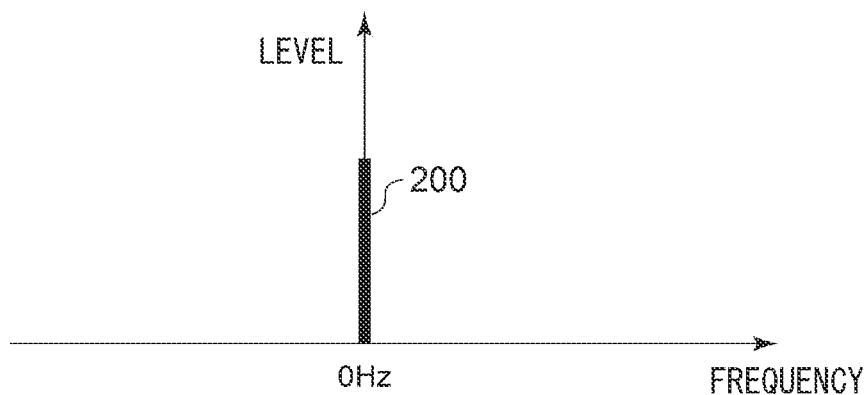
FIG. 7 shows the spectrum of the received signal subjected to frequency conversion.

The first adjacent channel attenuation filter 46a performs band limitation of the I signal. The band limitation attenuates the adjacent channel component. The first adjacent channel attenuation filter 46a outputs the band-limited I signal (hereinafter, also referred to as "I signal") to the demodulator 48. The second adjacent channel attenuation filter 46b performs band limitation of the Q signal. The band limitation attenuates the adjacent channel component. The second adjacent channel attenuation filter 46b outputs the band-limited Q signal (hereinafter, also referred to as "Q signal") to the demodulator 48. FIG. 7 shows the spectrum of the received signal 200 subjected to frequency conversion. Of the plurality of spurious components 210, the spurious component 210 closest to the received signal 200 is attenuated by the HPF 40, the remainder of the spurious components 210 is attenuated by the adjacent channel attenuation filters 46 so that only the received signal 200 remains as shown. Reference is made back to FIG. 1.

The demodulator 48 subjects the I signal from the first adjacent channel attenuation filter 46a and the Q signal from the second adjacent channel attenuation filter 46b to demodulation and outputs a sound signal or data from the demodulation. For the demodulation process, a publicly known technology may be used so that a description thereof is omitted.

When the frequency of the RF signal is "400 MHz" and the pass band width of the adjacent channel attenuation filters 46 is "±5 kHz", for example, the pass band of the adjacent channel attenuation filters 46 will be "400 MHz±5 kHz". When the frequency of the spurious component 210 closest to the RF signal is "400.002 MHz" in this situation, the spurious component 210 is included in the pass band of the adjacent channel attenuation filters 46 and so is not attenuated by the adjacent channel attenuation filters 46. Meanwhile, the second LowIF is set to 0 Hz in the reception device 100 according to the embodiment so that the spurious component 210 is attenuated by the HPF 40.

The features are implemented in hardware such as a CPU, a memory, or other LSIs of an arbitrary computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

According to the embodiment, the received signal is subject to frequency conversion so that the spurious component having a frequency closest to the frequency of the received signal is at 0 Hz before the received signal is passed through the HPF. Accordingly, the impact from the spurious component is reduced. Further, since the impact from the spurious component is reduced, suppression of the reception sensitivity caused by interference of harmonics can be automatically reduced. Further, since the received signal passed through the HPF is turned into a baseband signal by frequency conversion so that the received signal can be demodulated.

Embodiment 2

A description will now be given of embodiment 2. Embodiment 2 relates to a reception device like that of embodiment 1. Embodiment 2 differs from embodiment 1 in respect of the local signal that should be used for quadrature detection. To describe it more specifically, the reception device according to embodiment 2 uses a frequency-modulated local signal, by subjecting the control voltage of the reference oscillator to frequency modulation by using a low frequency. By using such a local signal for quadrature detection, the in-phase component and the orthogonal component of the received signal will also be frequency-modulated. The in-phase component and the orthogonal component of the received signal subjected to quadrature detection are processed by the HPF to reduce the spurious component that interferes with the received signal, but the component of the received signal remains. This reduces suppression of the reception sensitivity due to the spurious component and also reduces degradation due to reception distortion. Hereinafter, a difference from the foregoing will mainly be described.

Figure 8:
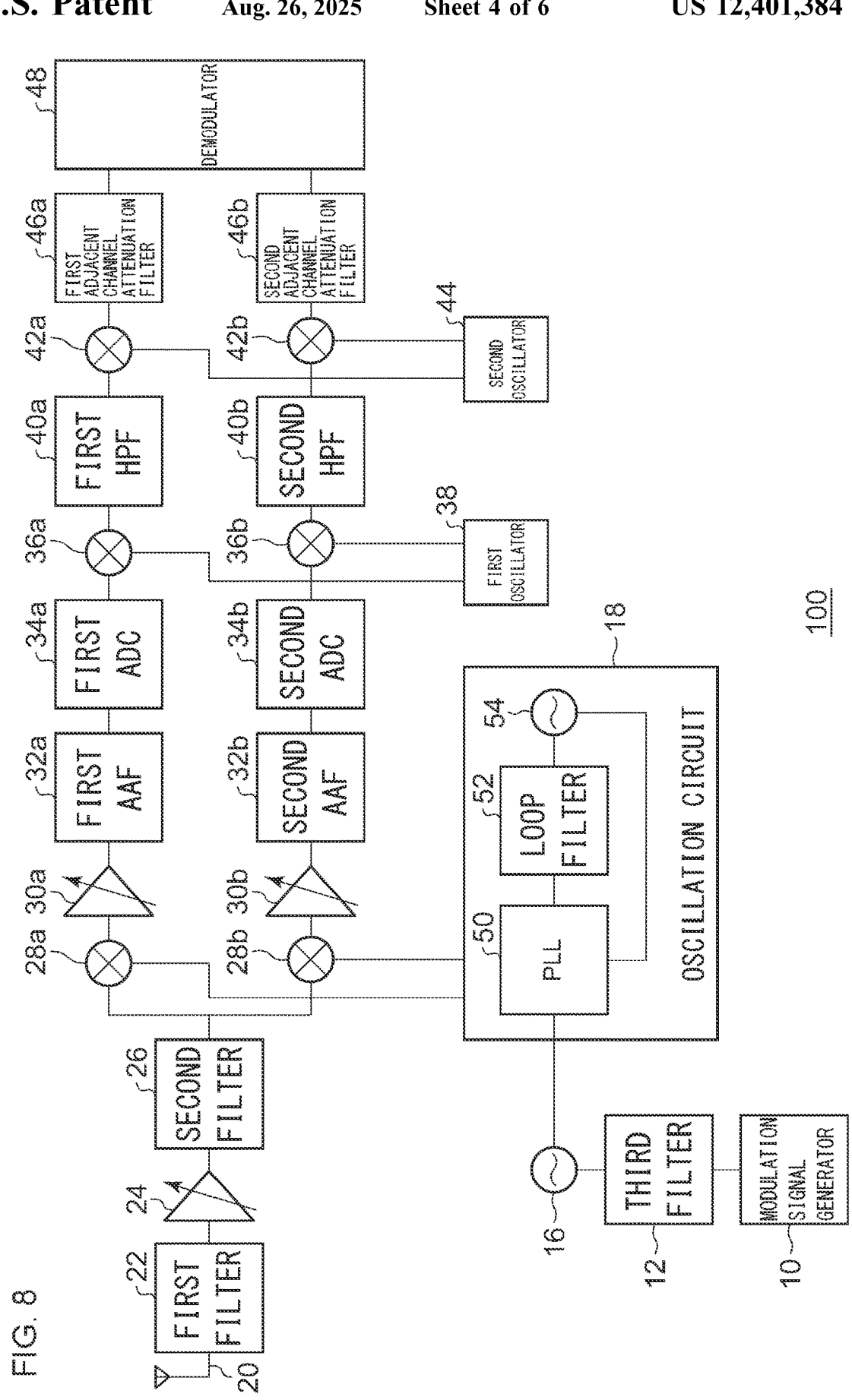
FIG. 8 shows a configuration of the reception device according to embodiment 2.

FIG. 8 shows a configuration of the reception device 100. In the reception device 100, a modulation signal generator 10 and a third filter 12 are added to the reception device 100 of FIG. 1.

The modulation signal generator 10 outputs a modulation signal for causing the reference oscillator 16 to perform modulation to the reference oscillator 16 via the third filter 12. The modulation signal from the third filter 12 is input to the controlled voltage terminal of the reference oscillator 16, and the frequency generated by oscillation in the reference oscillator 16 is frequency-modulated by the modulation signal. When the frequency modulation is performed at a modulation rate defined by a frequency within the band of the loop filter 52, the local signal output from the oscillation circuit 18 will also be frequency-modulated.

The first mixer 28a and the second mixer 28b subject the received signal and the spurious component produced by the reference oscillator to quadrature detection by using the frequency-modulated local signal. As in embodiment 1, the result of quadrature detection is shown as the I signal and the Q signal at the first Low IF. Unlike the case of embodiment 1, the I signal and the Q signal of embodiment 2 are frequency-modulated. The processes in the variable amplifier 30 and the subsequent stages are similar to those of embodiment 1.

Figure 9:
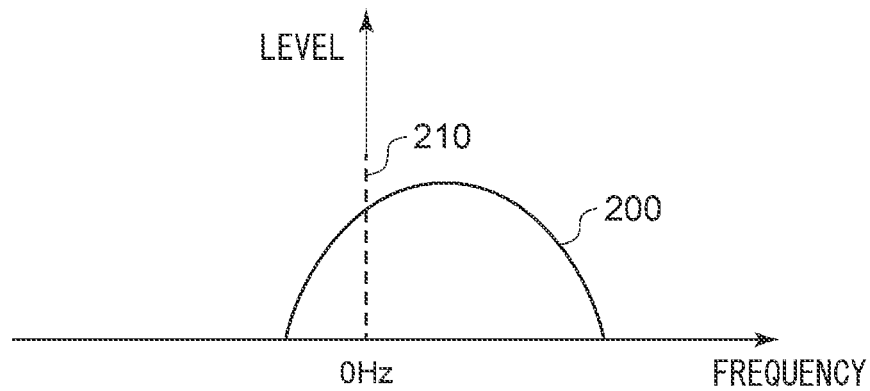
FIG. 9 shows the spectrum of the received signal and the spurious component produced by the reference oscillator that are subjected to frequency conversion.

FIG. 9 shows the spectrum of the received signal 200 and the spurious component 210 produced by the reference oscillator 16 that are subjected to frequency conversion. The figure shows a signal output from the mixers 36. Like FIG. 5, FIG. 9 shows only the spurious component 210 closest to the received signal 200. Further, the received signal 200 corresponds to the I signal and the Q signal described above. However, the received signal 200 is frequency-modulated by using the frequency-modulated local signal.

Figure 10:
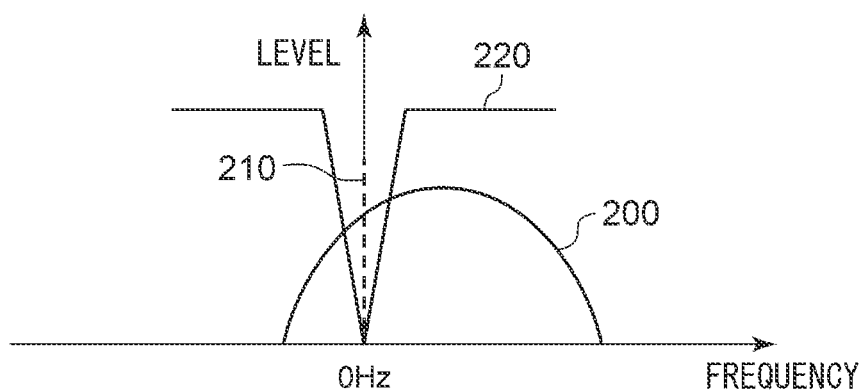
FIG. 10 shows a relationship between the received signal and the spurious component produced by the reference oscillator, which are subjected to frequency conversion, and the HPF.
Figure 11:
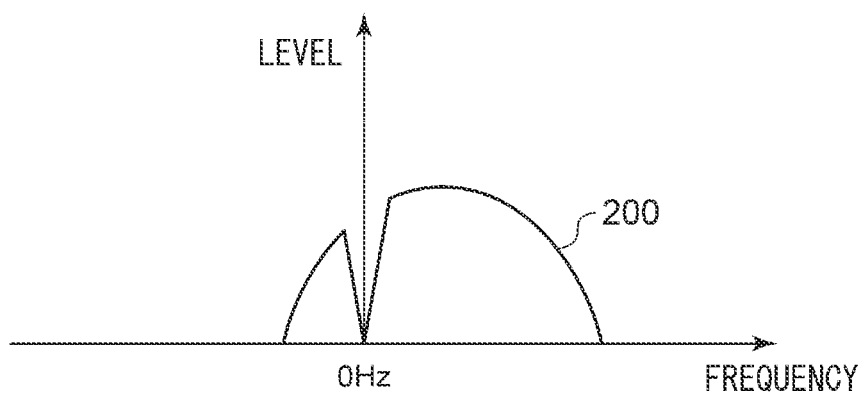
FIG. 11 shows the spectrum of the received signal passed through the HPF.

FIG. 10 shows a relationship between the received signal 200 and the spurious component 210 produced by the reference oscillator 16, which are subjected to frequency conversion, and the HPF 40. In addition to what is shown in FIG. 9, FIG. 6 shows the frequency characteristics 220 of the HPF 40. FIG. 11 shows the spectrum of the received signal 200 passed through the HPF 40. The first HPF 40a and the second HPF 40b eliminate the spurious component 210 that interferes with the received signal 200. Further, a portion of the received signal 200 is eliminated, but there are also portions that remain. In other words, the portion of the received signal 200 eliminated by the HPF 40 is reduced, regardless of whether the received signal 200 is an unmodulated wave or a modulated wave. This reduces degradation due to reception distortion.

Figure 12:
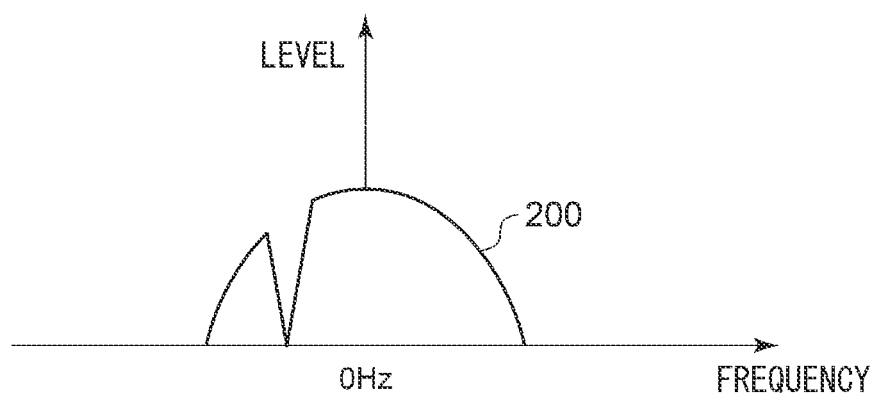
FIG. 12 shows the spectrum of the received signal subjected to frequency conversion.

FIG. 12 shows the spectrum of the received signal 200 subjected to frequency conversion. The figure shows a signal passed through the adjacent channel attenuation filters 46. The mixers 42 convert the received signal 200 into a baseband signal.

According to this embodiment, the reference frequency is frequency-modulated so that the received signal can be frequency-modulated by using the local signal. Further, since the received signal is frequency-modulated by using the local signal, components eliminated by processing the I signal and the Q signal with the HPF can be reduced. Further, since components eliminated by processing the I signal and the Q signal with the HPF are reduced, degradation due to reception distortion can be reduced. Further, since degradation due to reception distortion is reduced, 2 tone/5 tone decoding, etc. can be performed. Further, since the modulation signal to cause the reference oscillator to perform modulation is output to the reference oscillator, modulation in the reference oscillator can be performed.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the reception device 100 according to embodiments 1, 2, the second LowIF is set by the frequency conversion by the mixers 36 so that the spurious component 210 closest to the received signal 200 is at 0 Hz. However, the embodiment is non-limiting as to the setting, and the second LowIF may be set so that the spurious component 210 closest to the received signal 200 is not at 0 Hz. In that process, an attenuation filter that attenuates the frequency of the spurious component 210 may be used in place of the HPF 40. According to this variation, the flexibility in configuration can be improved.

What is claimed is:
1. A reception device comprising:
a reference oscillator;
an oscillation circuit that performs phase locked loop (PLL) control by using a frequency generated by the reference oscillator by oscillation as a reference frequency;
a quadrature detector that subjects a receiving signal by using a local signal output from the PLL control in the oscillation circuit;
an analog to digital converter (ADC) that subjects an in-phase component and an orthogonal component of the received signal subjected to the quadrature detection by the quadrature detector to analog-digital conversion;

a first complex mixer that subjects an output signal of the ADC to frequency conversion so that, of harmonics of the frequency generated by the reference oscillator by oscillation, a harmonic having a frequency closest to a frequency of the received signal subjected to the quadrature detection by the quadrature detector has a predetermined frequency;

a first high pass filter that attenuates the predetermined frequency in the in-phase component of the received signal subjected to the frequency conversion by the first complex mixer and passes a first signal component of an output signal of the first complex mixer;

a second high pass filter that attenuates the predetermined frequency in the orthogonal-phase component of the received signal subjected to the frequency conversion by the first complex mixer and passes a second signal component of an output signal of the first complex mixer;

a second complex mixer that subjects the in-phase component of the received signal passed through the first high pass filter and the orthogonal component of the received signal passed through the second high pass filter to frequency conversion so that the frequency of the received signal is 0 Hz;

a first adjacent channel attenuation filter that attenuates an adjacent channel component in the in-phase component of the received signal subjected to the frequency conversion by the second complex mixer; and a second adjacent channel attenuation filter that attenuates an adjacent channel component in the orthogonal phase component of the received signal subjected to the frequency conversion by the second complex mixer; wherein the first complex mixer subjects the in-phase component and the orthogonal component of the received signal subjected to the quadrature detection by the quadrature detector to the frequency conversion so that, of harmonics of the frequency generated by the reference oscillator by oscillation, a harmonic having a frequency closest to the frequency of the received signal subjected to the quadrature detection by the quadrature detector is at 0 Hz;

the first high pass filter passes a high-frequency component in the in-phase component of the received signal subjected to the frequency conversion by the first complex mixer, and the second high pass filter passes a high-frequency component in the orthogonal component of the received signal subjected to the frequency conversion by the first complex mixer.

2. The reception device according to claim 1, wherein the frequency generated by the reference oscillator by oscillation is modulated within a band of a loop filter of the oscillation circuit.

* * * * *